United States Patent [19]

Lopatin et al.

[11] Patent Number: 4,874,567

[45] Date of Patent: Oct. 17, 1989

[54] MICROPOROUS MEMBRANES FROM POLYPROPYLENE

[75] Inventors: George Lopatin, Newton Centre; Larry Y. Yen, Tewksbury; Randall R. Rogers, Billerica, all of Mass.

[73] Assignee: Millipore Corporation, Bedford, Mass.

[21] Appl. No.: 42,138

[22] Filed: Apr. 24, 1987

[51] Int. Cl.$^4$ ............................................. B29D 27/04
[52] U.S. Cl. ................................... 264/45.1; 210/490; 210/500.36; 264/288.8
[58] Field of Search ............... 210/490, 500.13, 500.36, 210/41, 49; 264/45.1, 288.8; 428/315.5

[56] References Cited

U.S. PATENT DOCUMENTS

| | | | |
|---|---|---|---|
| 3,713,875 | 1/1973 | Beyer et al. | 210/490 X |
| 4,214,020 | 7/1980 | Ward et al. | 210/490 X |
| 4,406,673 | 9/1983 | Yamada et al. | 264/45.1 X |
| 4,519,909 | 5/1985 | Castro | 210/500.27 |
| 4,539,256 | 9/1985 | Shipman | 264/41 X |
| 4,726,989 | 2/1988 | Mrozinski | 264/288.8 X |

Primary Examiner—Frank Spear
Attorney, Agent, or Firm—Andrew T. Karnakis; Paul J. Cook

[57] ABSTRACT

Microporous polypropylene membrane or hollow fibers is formed from a melt blend of 5 to 20 weight percent polypropylene and a solvent. The melt blend is shaped and cooled to effect solid phase separation of the polypropylene from the blend. The solvent is separated from the polypropylene by extraction and the porous polypropylene is dried under restraint to prevent shrinkage.

8 Claims, 3 Drawing Sheets

MICROPOROUS MEMBRANES FROM POLYPROPYLENE

BACKGROUND OF THE INVENTION

This invention relates to a process for producing microporous polypropylene membranes and to the membrane so-produced.

Microporous membranes include thin sheets and hollow fibers generally formed from synthetic thermoplastic materials and having a substantially continuous matrix structure containing open pores or conduits of small size. The size range for pores of "microporous membranes" is not precisely defined in the art, but it is generally understood to extend from about 0.05 microns to about 10 microns.

It is disclosed in U.S. Pat. Nos. 4,247,498 and 4,519,909 as well as in European Patent Application No. 83306651.7 and 83306652.5 that polypropylene microporous membranes can be formed by casting under conditions to effect a thermally induced phase separation. A mixture of polypropylene and an initially incompatible liquid is heated to form a homogeneous solution which is then cooled under non equilibrium thermodynamic conditions to initiate liquid-liquid phase separation. The polypropylene is solidified by further cooling and the liquid dispersed within the solid matrix is removed by extraction to form a microporous structure. It is disclosed that different microporous structures can be formed by varying the cooling rate. A slow cooling rate produces a cellular microstructure whereas a rapid cooling rate results in a lacey noncellular structure. It is disclosed that the choice of solvents is critical and only those which will result in liquid-liquid phase separation are useful. The solvents which exhibit solid (crystalline)-liquid separation behavior are not useful in producing microporous structure. In particular, dioctyl phthalate is specifically disclosed as being a nonuseful solvent in these processes. U.S. Pat. No. 4,539,256 and 4,519,909 also discloses a method for forming microporous membranes from polypropylene at column 13, lines 17-28. In the process, between 30 and 80 weight percent of a polymer is mixed with a solvent at an elevated temperature high enough to dissolve the polypropylene. Thereafter the mixture is cooled to effect crystallization of the polypropylene and a shaped article such as a film is formed during the cooling. The article is subsequently subjected to stretching (orientation) in order to produce the desired product. The resultant product is microporous characterized by a multiplicity of spaced, randomly dispersed non-uniform shaped, nonporous particles of the polypropylene. Adjacent particles throughout the material are separated from one another to provide micropores and which particles are connected to each other by a plurality of fibrils consisting of the polypropylene. Suitable solvents include mineral oil and dioctyl phthalate. Since this product must be oriented or highly stretched during its formation, it cannot be deposited directly on a substrate which cannot be highly stretched such as a woven, nonwoven or knitted substrate.

It would be desirable to provide a process for producing microporous polypropylene membranes which permit the use of solvents which effect a solid (crystalline)-liquid phase separation since it would promote solubilization of the polymer in the solvent. In addition, it would be desirable to provide such a process which produces a product having uniform porosity and which eliminates the need for stretching of the product during formation so that the product can be deposited directly upon a suitable substrate such as a porous woven or unwoven substrate which cannot be stretched. If such a process were available, the membrane could be formed onto the porous substrate directly in order to produce laminates having the increased mechanical strength which would permit their use in a wide variety of filtration environments.

SUMMARY OF THE INVENTION

In accordance with this invention, microporous membranes are formed from polypropylene having an open pore structure which is permeable to both liquids and gases and can be used as filtration media. A mixture is formed comprising between about 5 and 20 weight percent polypropylene and the remainder a solvent which permits solid (crystalline)-liquid separation. The mixture is heated and extruded to form a film or hollow fibers which then is quenched to effect phase separation of the polypropylene from the solvent. The solvent is separated from the polypropylene by extraction and the resultant polypropylene membrane is dried under restraint in order to minimize or prevent membrane shrinkage and collapse. In addition, the present invention provides laminate products wherein a porous polypropylene membrane sheet produced by the process of this invention is adhered directly to a porous sheet substrate on one or both surfaces of the membrane without the use of an adhesive.

DESCRIPTION OF SPECIFIC EMBODIMENTS

Figure 1:
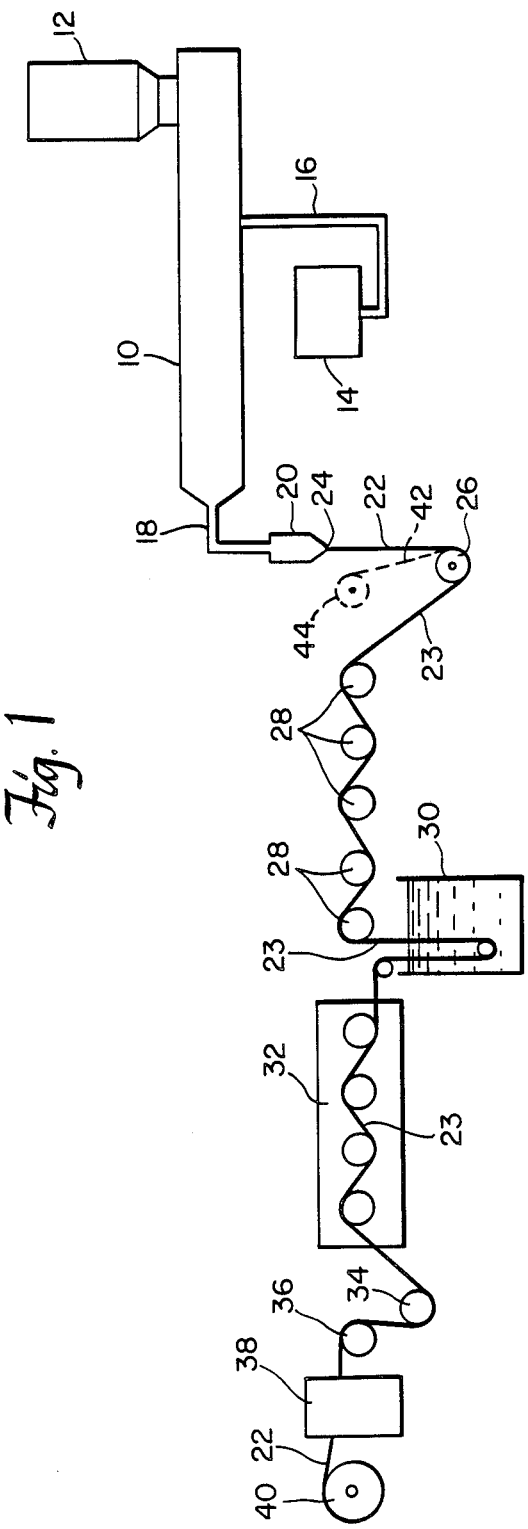
FIG. 1 is a flow diagram depicting the process of this invention.

In accordance with this invention, it has been found that membranes having a desired porosity and strength can be formed from a melt blend of polypropylene and a solvent which permits solid (crystalline)-liquid phase separation wherein the polypropylene comprises between about 5 and about 20 percent weight percent of the blend. If a proportion of polypropylene greater than about 20 weight percent in the blend is employed, the resulting membrane will have an undesirably low porosity while membranes formed from melt blends having a concentration of polypropylene less than about 5 percent are too weak for use in a filtration environment. The use of this type of solvent also has been found to be essential in the process of this invention. In contrast, if a solvent which effects liquid-liquid phase separation such as dibutyl phthalate is utilized as the solvent or porogen, the resultant membrane may form closed cells and is not suitable for filtration.

In the first step of this invention a melt blend of polypropylene and solvent is prepared which contains between about 5 and 20 percent of polypropylene based upon the total weight of the blend. The melt blend of polypropylene and solvent is formed by heating to at least the melting temperature of the polypropylene and usually between about 180° and about 220° C. In the formation of the melt blend, the polypropylene and the solvent are mixed such as in the mixing barrel of a conventional twin screw extruding apparatus wherein the mixture is heated during mixing.

The melt blend is passed from the extrusion zone through a slot die or a hollow fiber die to form molten film or molten hollow fibers. The molten film or hollow fibers then is quenched such as by being passed through a quench bath comprising water or the like at a temperature below the phase separation temperature of the polypropylene to form gel film or hollow fiber. Alternatively, the extruded molten membrane or fibers can be quenched by being passed over cooled rollers at the appropriate temperature in order to effect phase separation of the polypropylene to form a gel-like membrane or fibers. The gel membrane or fibers then is immersed into a liquid bath which selectively imbibes the solvent thereby removing it from the polypropylene matrix without substantially softening or dissolving the polypropylene. The imbibing extraction liquid can also function as a quench medium such that the molten film or hollow fibers can be extruded directly into it. In this case, the quench and extraction steps take place in the same bath. Suitable imbibing liquids include haloethanes including 1,1,1-trichloroethane, 1,1 dichloro-2-fluoroethane, Freons or methanol or the like. Extraction can be effected at a temperature between about 20° C. and about 50° C. in order to maximize solvent extraction while not softening the polypropylene. The polypropylene then is dried at a temperature usually between about 20° C. and about 70° C. and, during drying, the polypropylene membrane is restrained in order to prevent shrinkage. Optionally, the dry polypropylene can be heat-set by heating it to a temperature between about 125° C. and about 150° C. in order to further set the characteristic of the membrane. The membrane then can be rolled onto a core for storage.

Representation of suitable solvents include dioctyl phthalate, mineral oil, hexatriacontane, octadecane, hexadecane, dodecane and decane.

In one embodiment of this invention, the extruded membrane, while hot, can be deposited onto a porous substrate such as a woven fabric, knitted or non-woven fabric, e.g. spun bonded or melt blown, or the like in order to adhere the heated polypropylene to the substrate. This embodiment can be effected since the extruded polypropylene of this invention is not stretched during subsequent processing. The direct deposition of the membrane of this invention onto a porous substrate provides advantages over prior art methods for forming laminates in that no adhesive is required. Also, the deposition can be effected as a single step with the normal processing of the membrane by threading the porous substrate so it contacts the membrane being processed over the rollers normally utilized in extrusion processing. In addition, since no stretching step is utilized in the process of this invention, the porosity and mechanical properties of the resulting laminate product can be made essentially isotropic.

The polypropylene microporous product of this invention is characterized by open pores of an average size of between about 0.1 and about 1 micron.

A typical process useful for producing the membrane product of this invention is depicting in FIG. 1. An extruder 10 is provided which is connected to a hopper 12 from which polypropylene is introduced into the extruder 10. A tank 14 and conduit 16 are provided for introducing the solvent into the extruder 10 for admixture with the polypropylene. The melt blend of polypropylene and solvent is removed from extruder 10 through conduit 18 and into die 20 from which a sheet membrane 22 exits through orifice 24. Extrudate film 22 passes over chill roll 26 where the extrudate film 22 is cooled to a temperature for effecting microphase separation of the polypropylene and the solvent into a gel membrane 23. The gel membrane 23 then passes over the guide rolls 28 and then through the bath 30 containing a liquid extractant for the solvent. Membrane 23 then passes out of the bath 30 into an enclosed heating zone 32 wherein the edges of the membrane 23 are restrained while the polypropylene membrane is optionally heated in order to dry the membrane. The membrane 23 then passes over guide rollers 34 and 36 into heat-setting zone 38 wherein the membrane 23 is heat-set by heating. The membrane 23 passes out of the heat-setting zone 38 onto wind up roller 40. In an alternative embodiment of this invention, a porous sheet substrate 42 which is housed on roller 44 can be directed to the chill roll 26 in order to contact the extrudate film 22 and be adhered to it without the use of an adhesive. This porous sheet can either be inserted between extrudate film 22 and chill roll 26, or alternatively be placed in contact with film 22 on the air side opposite to chill roll surface. Another embodiment will be to form a three layer laminate by sandwiching extrudate film 22 between two porous sheets. Since the substrate is porous, it will have little adverse affect on the liquid extraction steps, the drying step or the heat-setting step which are downstream of the chill roll 26.

The following examples illustrate the present invention and are not intended to limit the same.

As set forth below, the polypropylene/dioctyl phthalate (PP/DOP) and polypropylene/mineral oil (PP/MO) solutions used for making microporous PP membranes exhibit solid (crystalline)-liquid phase separation behavior.

The crystallization and melt temperatures for PP in the presence of DOP and MO (heavy white mineral oil) were measured by using the Perkin-Elmer DSC-2 differential scanning calorimeter (DSC). Data were obtained as a function of polymer concentration for each of the systems.

At each concentration, a mixture of polymer and solvent was prepared directly in the DSC sample pan and heated to above the melting temperature at 20° C./min. heating rate. The mixture was kept at 200° C. for about 10 mins. It was then cooled at 20° C./min cooling rate to a temperature below the crystallization peak. The crystallization temperature was taken as the temperature corresponding to the onset of crystallization. The mixture was then reheated at 20° C./min rate above the melting peak. The melting temperature was taken at the end of the peak, corresponding to the melting of the highest melting crystallites.

Figure 2:
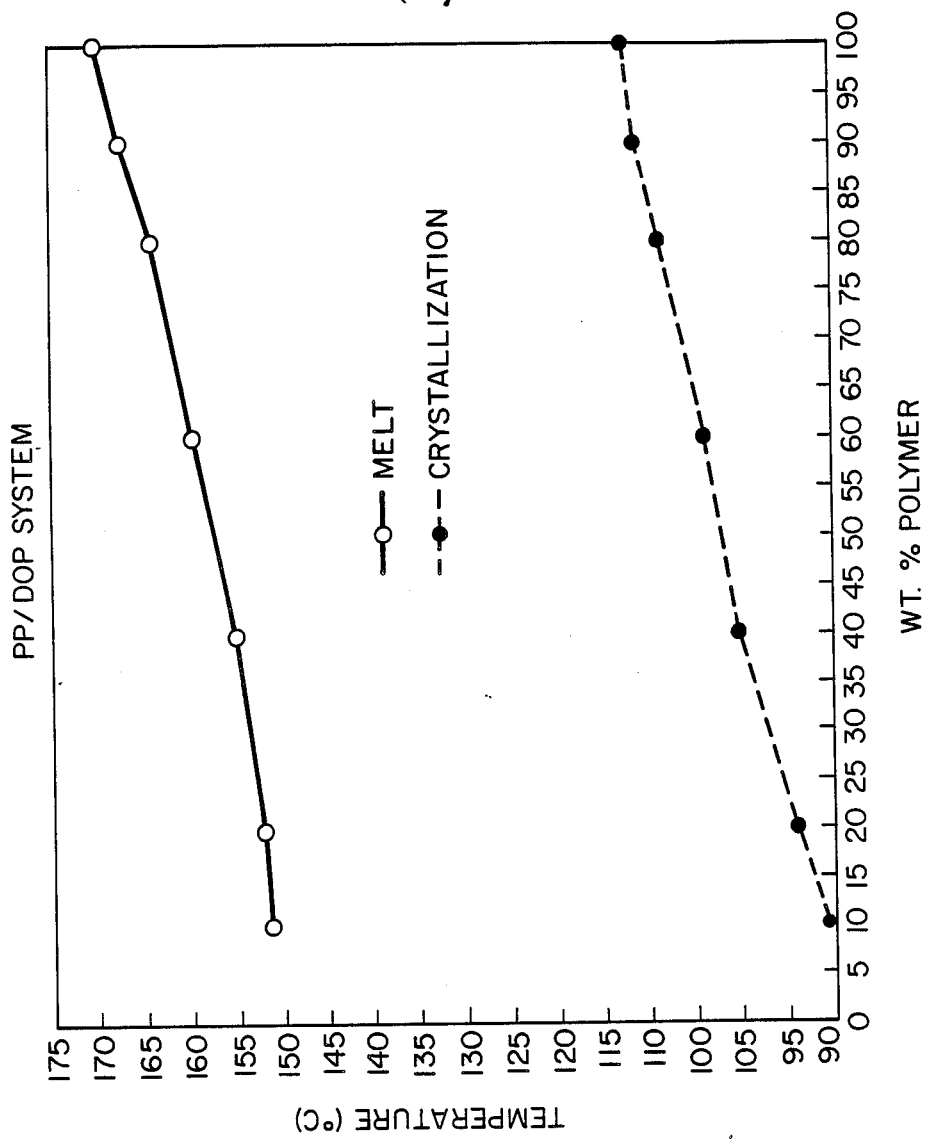
FIG. 2 shows the melt and crystallization curves for polypropylene and dioctyl phthalate.
Figure 3:
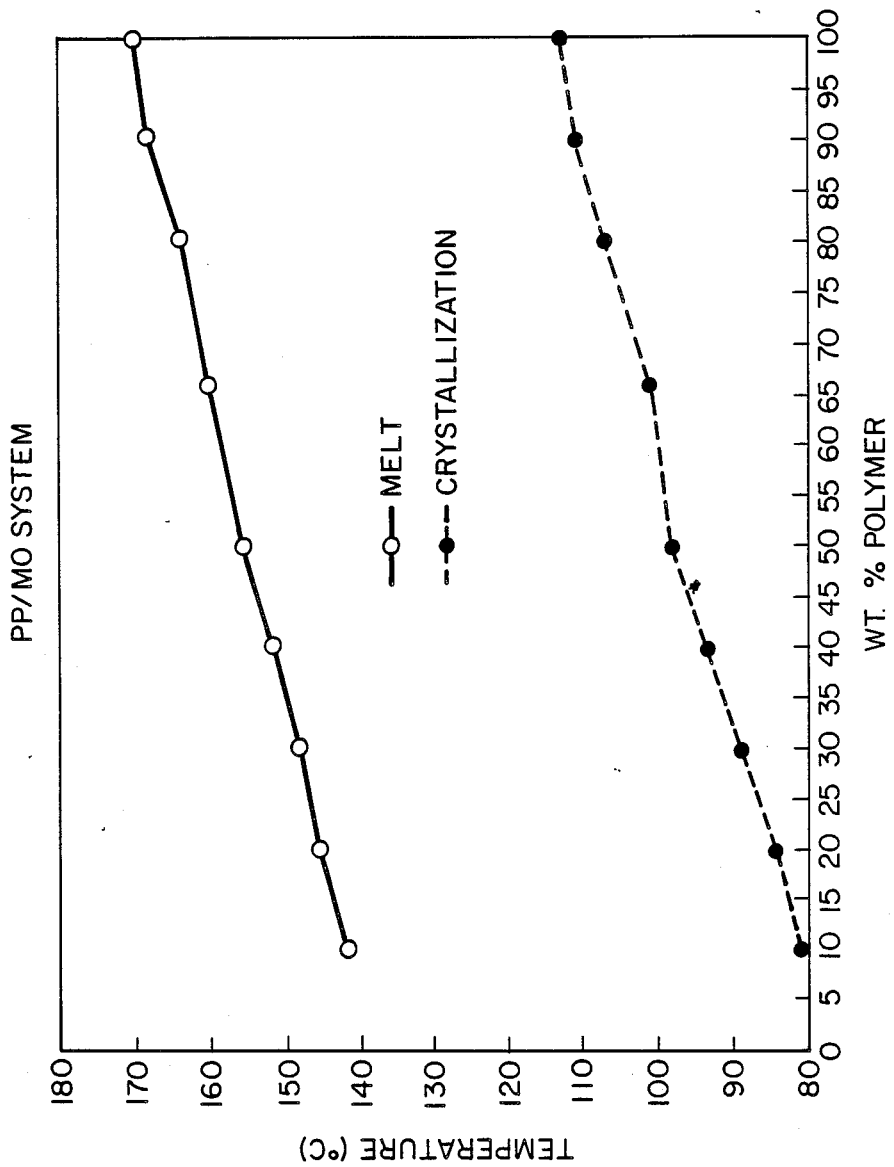
FIG. 3 shows the melt and crystallization curves for polypropylene and mineral oil.

The melt and crystallization curves for each of the PP/DOP and PP/MO systems are shown in FIGS. 2 and 3 respectively. In both systems, the melt and crystallization temperatures increase as a function of polymer concentration. No constancy in temperature is observed over any concentration range. These results demonstrate both PP/DOP and PP/MO systems exhibit crystalline (solid)/liquid phase separation behavior on cooling, and both solvents are thermodynamically good solvents for PP. A constancy in temperature over a portion of the concentration range would have demonstrated liquid-liquid phase separation behavior. A solvent exhibiting such behavior is a thermodynamically poorer solvent than dioctyl phthalate (DOP) or mineral oil (MO).

EXAMPLE 1

A 15% by weight polypropylene (PP) (Himont 6824 PM powder) slurry in DOP was prepared at room temperature. It was pumped into a heated Werner and Pfleiderer ZSK 30 co-rotating twin-screw extruder (L/D=27). The feed rate was approx. 40 lbs/hr with the screws rotating at 310 rpm. The screws in the extruder consist of interchangeable conveying and kneading disc elements of varying profiles to allow for melting, mixing and conveying of the blend. A Zenith gear pump, a Koch static mixer (1.5" diameter, 14" length) and a 16" wide film die were used downstream of the extruder. The temperature at various zones of the extrusion line ranged from 165° C. to 210° C. $N_2$ purge in the extruder was employed during the operation. The PP/DOP solution was extruded from the film die (die gap=0.33 mm) and quenched on a rotating chrome plated chill roll. The temperature of the chill roll was maintained by circulating thermostated liquid through its core. The extruded film after quench was about 75 um in thickness and was rolled up with a motorized wind-up unit.

To remove the DOP from the quenched PP/DOP film, a section of the film was restrained on a rectangular metal frame and placed in an excess volume of Freon TF (1, 1, 2-trichlorotrifluoroethane) solvent, which is miscible with DOP and practically inert to PP. The extraction time used was approximately two hours, with one Freon change during this time. The restrained sample was then removed from the Freon bath and, still restrained, allowed to dry at 70° C. After drying, the white microporous membrane was further heat-set with restraint at 148° C. for 10 mins. The properties of the membranes prepared at various chill roll quench temperatures are given in Table I.

TABLE I

| Microporous Polypropylene Membrane from Example 1 | | | | |
|---|---|---|---|---|
| Chill Roll Quench Temp. (°C.) | Final Membrane Thickness (μm) | Porosity (a) % | Iso-Propyl Alcohol (b) Bubble Point (psi) | Water Flow (c) Rate (ml/min/cm$^2$) |
| 39 | 42 | 52 | 44 | 3.1 |
| 49 | 49 | 60 | 32 | 5.4 |
| 59 | 52 | 66 | 21 | 12.0 |
| 69 | 63 | 70 | 18 | 14.9 |
| 79 | 71 | 74 | 15 | 19.5 |
| 84 | 76 | 77 | 10 | 39.0 |

(a) Percent void volume in sample
(b) ASTM E128-61
(c) ASTM F317-72 sample prewet with iso-propyl alcohol

EXAMPLE 2

A 20% by weight of PP (Himont 6824 PM powder) slurry in MO (ARCO prime 350) was used for extrusion and preparation of microporous PP membrane. The slurry feed rate was about 35 lbs./hr. The temperature of the chill roll was maintained at 30° C. and the quenched film was about 130 microns thick.

The removal of MO from the quenched PP/MO film was performed similarly as in Example 2 with the exception that the final membrane was dried from water rather than Freon. The Freon in the membrane after extraction was exchanged with water via an intermediate isopropyl alcohol exchange. The drying from water allowed the restrained membrane to remain intact without breaking. The drying and heat set temperature were the same as in Example 1. The properties of this membrane are given in Table II.

TABLE II

| Microporous Polypropylene Membrane from Example 2 | | | | |
|---|---|---|---|---|
| Chill Roll Quench Temp. (°C.) | Final Membrane Thickness (um) | Porosity (a) % | Iso-Propyl Alcohol (b) Bubble Point (psi) | Water Flow (c) Rate (ml/min/cm$^2$) |
| 30 | 85 | 43 | 20 | 9.2 |

We claim:

1. A process for forming a microporous polypropylene membrane which comprises the following steps in sequence:
   (a) forming a melt-blend consisting essentially of polypropylene and a solvent capable of effecting solid liquid phase separations of polypropylene therefrom containing between about 5 and 20 weight percent polypropylene based upon the weight of the blend,
   (b) shaping said melt-blend to form a shaped precursor to said membrane,
   (c) cooling said shaped precursor to a temperature at which said solvent separates from polypropylene by solid-liquid phase separation to form a gel film,
   (d) selectively extracting said solvent formed from said gel film in step (c) to form a microporous polypropylene membrane and
   (e) drying said membrane from step (d) while said membrane is restrained to prevent said membrane from shrinking.

2. The process of claim 1 wherein said shaped precursor is contacted with a porous sheet substrate to adhere said precursor to said sheet substrate prior to cooling said shaped precursor.

3. The process of claim 1 wherein said dried membrane is heat-set.

4. The process of claim 2 wherein said dried membrane is heat-set.

5. The process of any one of claim 2 or 4 wherein said substrate is a woven fabric.

6. The process of any one of claim 2 or 4 wherein said substrate is a non-woven fabric.

7. The process of any one of claims 1, 2, 3 or 4 wherein said solvent is dioctyl phthalate.

8. The process of any one of claims 1, 2, 3 or 4 wherein said solvent is mineral oil.

* * * * *